United States Patent
Sugi et al.

(10) Patent No.: US 9,854,137 B1
(45) Date of Patent: Dec. 26, 2017

(54) IMAGE PROCESSING APPARATUS, IMAGE FORMING APPARATUS, IMAGE PROCESSING METHOD, AND NON-TRANSITORY COMPUTER READABLE MEDIUM

(71) Applicant: FUJI XEROX CO., LTD., Tokyo (JP)

(72) Inventors: Shinsuke Sugi, Kanagawa (JP); Jungo Harigai, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/354,497

(22) Filed: Nov. 17, 2016

(30) Foreign Application Priority Data

Jun. 3, 2016 (JP) ................................. 2016-112003

(51) Int. Cl.
- *H04N 1/60* (2006.01)
- *G06F 15/00* (2006.01)
- *G06K 15/02* (2006.01)
- *G06K 1/00* (2006.01)

(52) U.S. Cl.
CPC ......... *H04N 1/6063* (2013.01); *G06K 15/188* (2013.01)

(58) Field of Classification Search
CPC ............................ H04N 1/6063; G06K 15/188
See application file for complete search history.

(56) References Cited

U.S. PATENT DOCUMENTS

| | | | |
|---|---|---|---|
| 2007/0002342 A1* | 1/2007 | Morales | H04N 1/6055 358/1.9 |
| 2007/0188782 A1* | 8/2007 | Sakurai | G06T 5/009 358/1.9 |
| 2010/0321747 A1 | 12/2010 | Sakamoto et al. | |
| 2015/0227825 A1 | 8/2015 | Koriyama et al. | |

FOREIGN PATENT DOCUMENTS

| | | |
|---|---|---|
| JP | 2007-221182 A | 8/2007 |
| JP | 5381380 B2 | 1/2014 |
| JP | 5664811 B1 | 2/2015 |

* cited by examiner

*Primary Examiner* — Quang N Vo
(74) *Attorney, Agent, or Firm* — Sughrue Mion, PLLC (57) ABSTRACT

An image processing apparatus includes a setting unit that sets a first threshold value serving as a determination criterion as to whether a color difference between a target value of a color and a value indicating a corresponding color of an image formed on a recording medium falls within a permissible range, a deriving unit that derives, using conversion information related to converting a color of an input image into a color of an output image, a second threshold value that serves as a limit of the color difference, an acquisition unit that acquires the color difference when the image is formed on the recording medium using the conversion information, and a notifying unit that, with the color difference acquired by the acquisition unit falling outside the permissible range, changes and then notifies contents of notification depending on whether the first threshold value is higher than the second threshold value.

15 Claims, 7 Drawing Sheets

| FIRST COLOR SPACE (INPUT) | | | | SECOND COLOR SPACE (TARGET VALUE) | | |
|---|---|---|---|---|---|---|
| C | M | Y | K | L* | a* | b* |
| 70 | 100 | 100 | 100 | 12.1 | 2.3 | 6.7 |
| 25 | 0 | 0 | 0 | 82.0 | -6.8 | -12.5 |
| 70 | 0 | 100 | 20 | 54.6 | -35.5 | 43.0 |
| ⋮ | ⋮ | ⋮ | ⋮ | ⋮ | ⋮ | ⋮ |

FIG. 6

| FIRST COLOR SPACE (INPUT) | | | | SECOND COLOR SPACE (MEASUREMENT VALUE) | | |
|---|---|---|---|---|---|---|
| C | M | Y | K | L* | a* | b* |
| 70 | 100 | 100 | 100 | 16.7 | 4.0 | 1.2 |
| 25 | 0 | 0 | 0 | 82.7 | -9.6 | -15.5 |
| 70 | 0 | 100 | 20 | 49.5 | -39.6 | 43.9 |
| ⋮ | ⋮ | ⋮ | ⋮ | ⋮ | ⋮ | ⋮ |

FIG. 7

| INPUT | | | | OUTPUT | | | |
|---|---|---|---|---|---|---|---|
| C | M | Y | K | C | M | Y | K |
| 70 | 100 | 100 | 100 | 65 | 95 | 100 | 100 |
| 25 | 0 | 0 | 0 | 20 | 0 | 0 | 0 |
| 70 | 0 | 100 | 20 | 70 | 5 | 100 | 25 |
| ⋮ | ⋮ | ⋮ | ⋮ | ⋮ | ⋮ | ⋮ | ⋮ |

IMAGE PROCESSING APPARATUS, IMAGE FORMING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-112003 filed Jun. 3, 2016.

BACKGROUND

Technical Field

The present invention relates to an image processing apparatus, an image forming apparatus, an image processing method, and a non-transitory computer readable medium.

SUMMARY

According to an aspect of the invention, there is provided an image processing apparatus. The image processing apparatus includes a setting unit that sets a first threshold value serving as a determination criterion as to whether a color difference as a difference between a target value of a color and a value indicating a corresponding color of an image formed on a recording medium falls within a permissible range, a deriving unit that derives, using conversion information related to converting a color of an input image into a color of an output image, a second threshold value that serves as a limit value of the color difference that is adjustable, an acquisition unit that acquires the color difference in a case where the image is formed on the recording medium using the conversion information, and a notifying unit that, with the color difference acquired by the acquisition unit falling outside the permissible range, changes contents of notification and notifies the changed contents of notification depending on whether the first threshold value is higher than the second threshold value.

BRIEF DESCRIPTION OF THE DRAWINGS

Exemplary embodiment of the present invention will be described in detail based on the following figures, wherein.

DETAILED DESCRIPTION

An exemplary embodiment of the present invention is described in detail with reference to the drawings.

Figure 1:
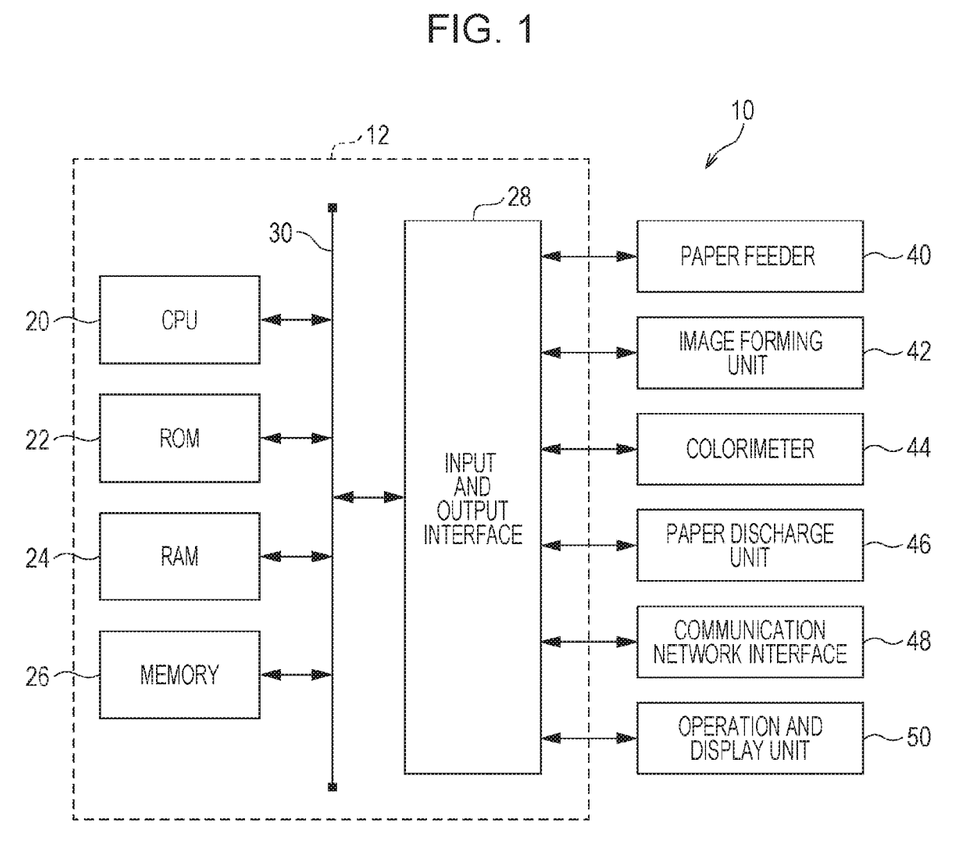
FIG. 1 is a block diagram illustrating an image forming apparatus of an exemplary embodiment.

Referring to FIG. 1, an image forming apparatus 10 of the exemplary embodiment is described below. In the following discussion, let C represent cyan, M represent magenta, Y represent yellow and K represent black. If elements in the image forming apparatus 10 and toner images are represented on a color by color basis, a reference number representing each element or each toner image is suffixed with a corresponding color letter (C, M, Y, or K). If the reference number of each element or each toner image is collectively represented without differentiating one color from another, the suffix is omitted.

As illustrated in FIG. 1, the image forming apparatus 10 of the exemplary embodiment includes a controller 12, a paper feeder 40, an image forming unit 42, a colorimeter 44, a paper discharge unit 46, a communication network interface 48, and an operation and display unit 50.

The controller 12 of the exemplary embodiment includes a central processing unit (CPU) 20 that generally operates the image forming apparatus 10, and a read-only memory (ROM) 22 that pre-stores a variety of programs and parameters. The controller 12 further includes a random-access memory (RAM) 24 that serves as a work area when the CPU 20 executes the variety of programs, a non-volatile memory 26, such as a flash memory, and an input and output interface 28.

The CPU 20, the ROM 22, the RAM 24, the memory 26, and the input and output interface 28 are interconnected to each other via a bus 30, such as an address bus, a data bus, and a control bus. The input and output interface 28 is connected to a paper feeder 40, an image forming unit 42, a colorimeter 44, a paper discharge unit 46, a communication network interface 48, and an operation and display unit 50.

The paper feeder 40 of the exemplary embodiment includes a paper sheet tray that contains a stack of paper sheets P as an example of a recording medium (see FIG. 3 and FIG. 4), and a feeding mechanism that picks up the paper sheets P stacked in the paper sheet tray one by one and then feeds the picked up paper sheet to the image forming unit 42 described below.

The image forming unit 42 of the exemplary embodiment includes an image forming assembly for each of the C, M, Y, and K colors in a first color space (a CMYK color space in the exemplary embodiment) that is device-dependent. Each color image forming assembly includes a photoconductor drum, a charging device that charges the surface of the photoconductor drum, and an exposure device that radiates light to the charged surface of the photoconductive drum to form an electrostatic latent image on the charged surface. Each color image forming assembly further includes a developing device that develops a toner image as a visible image using a developer from the electrostatic latent image formed on the surface of the photoconductive drum as a result of the radiation of the exposure light by the exposure device.

The image forming unit 42 includes an endless intermediate transfer belt, and a first transfer roller supported on the opposite side of the photoconductive drum with the intermediate transfer belt sandwiched between the photoconductive drum and the first transfer roller. In this arrangement, the C, M, Y, and K color images successively formed on the respective image forming assemblies are respectively transferred onto the intermediate transfer belt by the first transfer rollers in an overlay fashion.

The image forming unit 42 includes a second transfer roller. The second transfer roller is supported on the opposite side of an auxiliary roller with the intermediate transfer belt sandwiched between the auxiliary roller and the second transfer roller. The second roller transfers the toner image, transferred onto the intermediate transfer belt, onto a paper sheet P. The second transfer roller is electrically grounded, and the auxiliary roller forms an opposite electrode with respect to the second transfer roller. The toner image is transferred from the intermediate transfer belt to the paper sheet P by applying a second transfer bias voltage to the auxiliary roller.

The image forming unit 42 further includes a fixing device that fixes the toner image onto the paper sheet P by pressing and heating the transferred toner image.

The colorimeter 44 of the exemplary embodiment reads an image formed on the paper sheet P by the image forming unit 42, and outputs image data obtained by reading the image to the CPU 20 via the input and output interface 28. The colorimeter 44 outputs to the CPU 20 the image data as device-independent color data (the L*a*b* color space in the exemplary embodiment).

The paper discharge unit 46 of the exemplary embodiment includes a discharge assembly into which the paper sheet P is discharged, and a discharge mechanism that discharges the paper sheet P. The paper sheet P has the image formed thereon by the image forming unit 42 and then read by the colorimeter 44.

The communication network interface 48 of the exemplary embodiment transmits and receives communication data to and from an external apparatus. The operation and display unit 50 of the exemplary embodiment receives a command on the image forming apparatus 10 input from a user while displaying to the user a variety of information related to operational statuses of the image forming apparatus 10. The operation and display unit 50 includes a display button that implements the reception of an operation command by executing a program, a display having a touch panel disposed on a display screen thereof and configured to display a variety of information on the display screen, and hardware keys, such as numeric keys and a start button.

Figure 2:
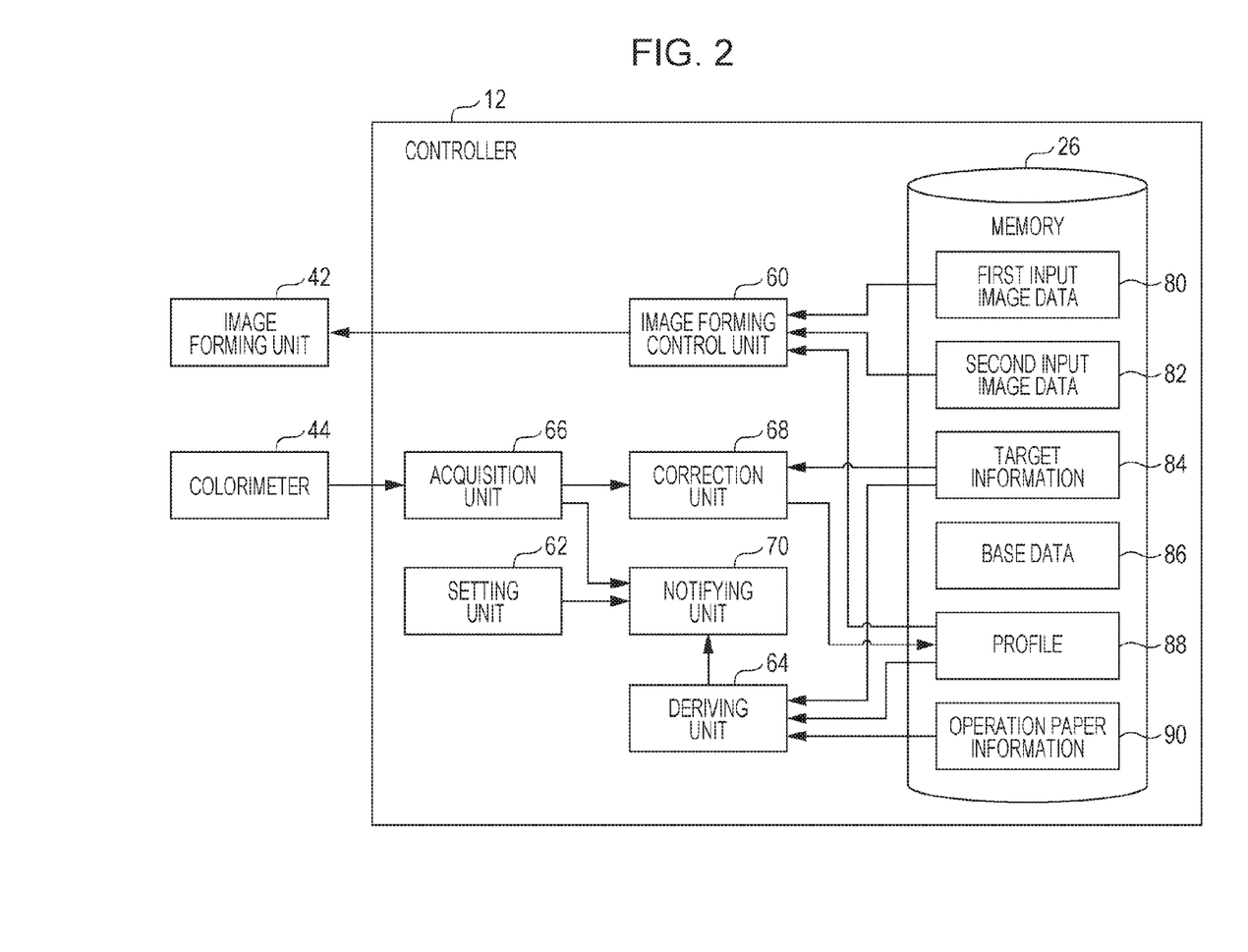
FIG. 2 is a functional block diagram illustrating a controller in the image forming apparatus of the exemplary embodiment.

The functional configuration of the controller 12 of the exemplary embodiment is described below with reference to FIG. 2. As illustrated in FIG. 2, the controller 12 includes an image forming control unit 60, a setting unit 62, a deriving unit 64, an acquisition unit 66, a correction unit 68, and a notifying unit 70. The memory 26 stores first input image data 80, second input image data 82, target information 84, base data 86, a profile 88, and operation paper information 90.

Figure 3:
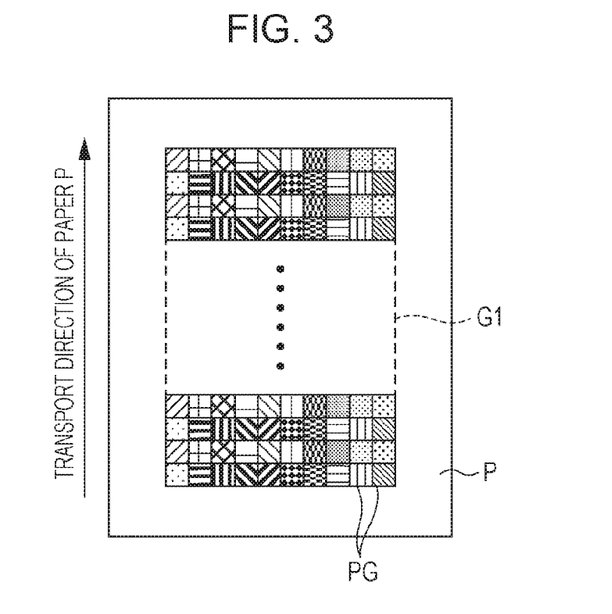
FIG. 3 is a plan view illustrating an example of a first output image of the exemplary embodiment.

The first input image data 80 of the exemplary embodiment includes color data including predetermined multiple colors (1584 colors in the exemplary embodiment), with each color being a combination of CMYK colors. FIG. 3 illustrates an example of the first output image G1 that the image forming unit 42 forms on the paper sheet P in accordance with the first input image data 80. Referring to FIG. 3, the first output image G1 of the exemplary embodiment includes patch images PG of 1584 different colors.

Figure 4:
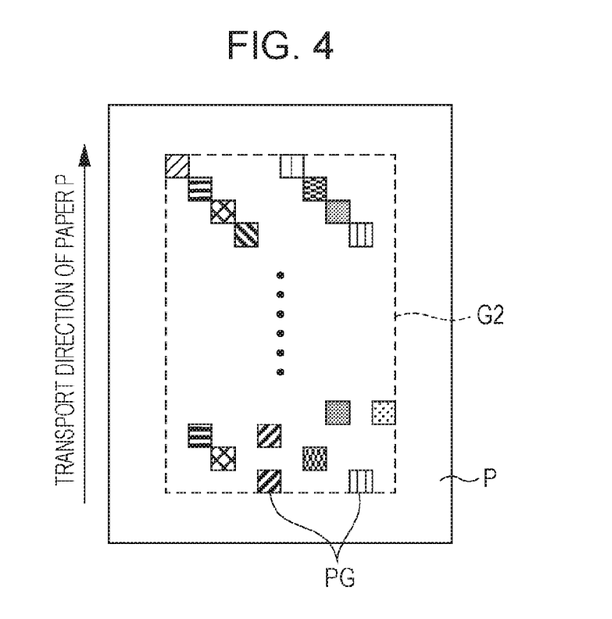
FIG. 4 is a plan view illustrating an example of a second output image of the exemplary embodiment.

The second input image data 82 of the exemplary embodiment includes the number of multiple colors (200 colors in the exemplary embodiment) smaller than the number of colors of the first input image data 80, with each color being a combination of CMYK colors. FIG. 4 illustrates an example of a second output image G2 that the image forming unit 42 forms on the paper sheet P in accordance with the second input image data 82. Referring to FIG. 4, the second output image G2 of the exemplary embodiment includes patch images PG of 200 different colors. In the exemplary embodiment, each color of the second input image data 82 is included in the first input image data 80. The present invention is not limited to this setting. In the exemplary embodiment, each of the first output image G1 and the second output image G2 may include a patch image PG with no toner used when an image is formed (in the exemplary embodiment, the value of each of Y, M, C, and K is zero).

Figure 5:
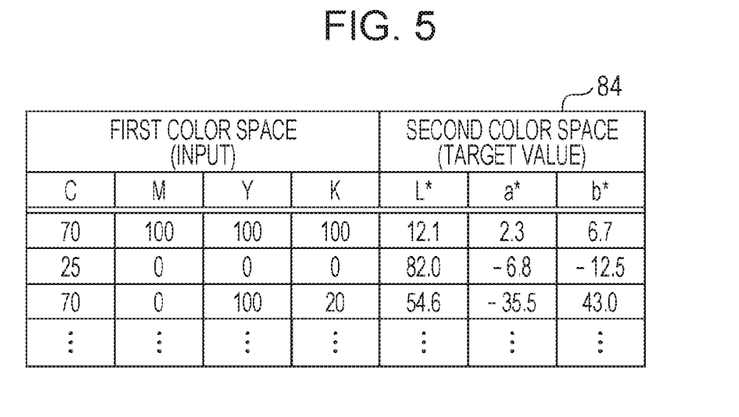
FIG. 5 diagrammatically illustrates an example of target information of the exemplary embodiment.

The target information 84 of the exemplary embodiment is an example of the target value of a color, and is information that indicates an association relationship between color data in a first color space and color data in a second color space serving as a target of an image that the image forming unit 42 forms on the paper sheet P in accordance with the color data in the first color space. FIG. 5 illustrates an example of the target information 84. Referring to FIG. 5, the color data in the first color space is associated with the color data in the second color space on a one-to-one basis in the target information 84 of the exemplary embodiment, and the associated color data is stored on the memory 26. The color data in the first color space in the target information 84 is data indicating a color identical to a color of a patch image PG included in the first output image G1. In other words, the target information 84 includes information that indicates an association relationship between the color data of 1584 colors in the first color space and the color data in the second color space. In accordance with the exemplary embodiment, the target information 84 related to the paper sheet P, such as a predetermined type and color of the paper sheet P, is stored on the memory 26 at the time of the shipment of the image forming apparatus 10. The target information 84 thus includes information indicating the type and color of the paper sheet P.

Figure 6:
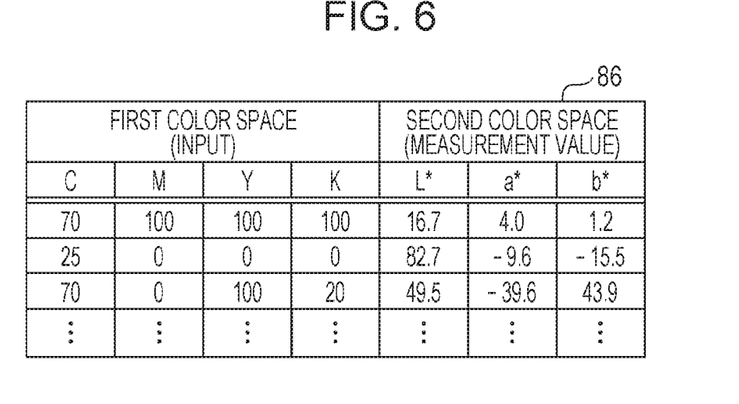
FIG. 6 diagrammatically illustrates an example of base data of the exemplary embodiment.

The base data 86 of the exemplary embodiment is information that indicates an association relationship between the color data in the first color space and the color data in the second color space that is a measurement value that results from the colorimeter 44 reading an image formed on the paper sheet P by the image forming unit 42 in accordance with the color data in the first color space. FIG. 6 illustrates an example of the base data 86. In the base data 86 of the exemplary embodiment as illustrated in FIG. 6, the color data in the first color space and the measurement value of the color data in the second color space are associated on a one-to-one basis and then stored on the memory 26. In accordance with the exemplary embodiment, at the time of the shipment of the image forming apparatus 10, the memory 26 stores the base data 86 based on the measurement value that results from the colorimeter 44 reading the first output image G1 formed by the image forming unit 42 on the paper sheet P that is the same paper sheet P as that of the target information 84. More specifically, the base data 86 also includes information that indicates an association relationship between the color data in the first color space of 1584 colors and the measurement values of the color data in the second color space.

The following discussion is based on the premise that the number of pieces of information indicating the association relationship forming the target information 84 is equal to the number of pieces of information indicating the association relationship forming the base data 86. But the present invention is not limited to the premise. For example, the number of pieces of information indicating the association relationship forming the target information 84 may be different from the number of pieces of information indicating the association relationship forming the base data 86.

Figure 7:
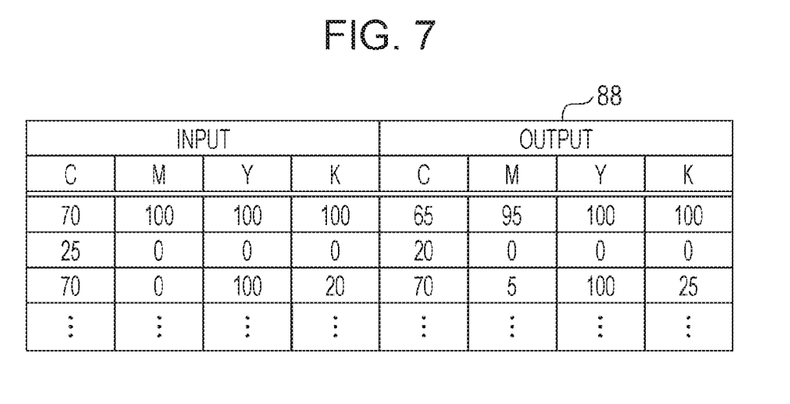
FIG. 7 diagrammatically illustrates an example of a profile of the exemplary embodiment.

The profile 88 of the exemplary embodiment is an example of conversion information indicating an association relationship of a conversion of the color of an input image in the first color space into the color of an output image. The profile 88 is produced in accordance with the target information 84 and the base data 86 such that the color of the image formed on the paper sheet P by the image forming unit 42 becomes close to or matches a target color indicated by the target information 84. FIG. 7 illustrates an example of the profile 88. Referring to FIG. 7, the profile 88 of the exemplary embodiment is stored on the memory 26 with the color data input in the first color space associated with the output color data on a one-to-one basis. In accordance with the exemplary embodiment, at the time of the shipment of the image forming apparatus 10, the memory 26 stores the profile 88 produced in accordance with the target information 84 and the base data 86. More specifically, in accordance with the exemplary embodiment, the profile 88 includes information indicating a conversion relationship between the input color data in the first color space of 1584 colors and the output color data.

The profile 88 of the exemplary embodiment includes information indicating the production condition of the profile 88. The information indicating the production condition includes information indicating whether the profile 88 has been produced under a relative condition or an absolute condition. For example, the color of the input image may now be white (for example, each of the values of Y, M, C, and K colors is zero), and information of a base color of the paper sheet P may indicate white. If forming an image on the paper sheet P is attempted using the profile 88 produced under the relative condition, the base color of the paper sheet P is output as it is with no image formed on the paper sheet P.

The color of the input image may now be white, and information of a base color of the paper sheet P may indicate gray (such as the base color of newspapers). If forming an image on the paper sheet P is attempted using the profile 88 produced under the absolute condition, a gray image is formed on the paper sheet P. The information indicating the production condition of the profile 88 may include information indicating a color whose color purity is guaranteed.

The operation paper information 90 of the exemplary embodiment includes information indicating the type and the base color of the paper sheet P that the user has set using the operation and display unit 50 and that is used in the image forming apparatus 10.

By controlling the image forming unit 42, the image forming control unit 60 of the exemplary embodiment forms the first output image G1 on the paper sheet P in accordance with data that is obtained by converting the first input image data 80 stored on the memory 26 using the profile 88. By controlling the image forming unit 42, the image forming control unit 60 also forms the second output image G2 on the paper sheet P in accordance with the data that is obtained by converting the second input image data 82 stored on the memory 26 using the profile 88.

The setting unit 62 of the exemplary embodiment sets a first threshold value that serves as a determination criterion according to which a determination is made as to whether a color difference that is a difference between the target information 84 and the color of the second output image G2 formed on the paper sheet P falls within a permissible range. More specifically, the setting unit 62 sets to be the first threshold value a set value the user has input using the operation and display unit 50 at the setting of the image forming apparatus 10.

The deriving unit 64 of the exemplary embodiment derives a second threshold value as a limit value of the color difference that is adjustable using the profile 88. In accordance with the exemplary embodiment, based on the target information 84, the operation paper information 90, and the production condition of the profile 88, the deriving unit 64 derives a theoretical value of the limit value of the color difference that is adjustable using the profile 88. The theoretical value may be derived using a preset color conversion table or a color conversion arithmetic expression or a color prediction model using a neural network.

The deriving unit 64 derives the second threshold value by adding to the theoretical value a statistical value of differences, each of the differences being a difference between the theoretical value that has been derived in the past in a case where the color difference acquired by the acquisition unit 66 to be described below falls within a permissible range and the color difference that has been acquired by the acquisition unit 66 when the theoretical value has been derived. The statistical value is an error component of the theoretical value derived in the past. In accordance with the exemplary embodiment, the statistical value is a mean value. In the present invention, the statistical value is not limited to the mean value. For example, the statistical value may be a different value, such as a median or a mode.

The acquisition unit 66 of the exemplary embodiment acquires the color difference when the second output image G2 is formed on the paper sheet P. More specifically, the acquisition unit 66 acquires the color data that results from the colorimeter 44 reading the second output image G2 formed on the paper sheet P. The acquisition unit 66 derives the mean value of the color differences between the corresponding colors in the acquired color data and the target information 84 (hereinafter referred to as a "mean color difference"). Note that the acquisition unit 66 may derive another statistical value, such as the median or the mode, of the color differences between the corresponding colors in the acquired color data and the target information 84.

The correction unit 68 of the exemplary embodiment performs an interpolation operation on the color data that results from the colorimeter 44 reading the second output image G2 formed on the paper sheet P, thereby acquiring color data of colors of the number corresponding to the target information 84. Based on the derived color data and the target information 84, the correction unit 68 corrects the profile 88 stored on the memory 26 so that the color difference between the corresponding colors in the derived color data and the target information 84.

With the mean color difference derived by the acquisition unit 66 falling outside the permissible range, the notifying unit 70 of the exemplary embodiment changes contents of notification and notifies the changed contents of notification depending on whether the first threshold value is higher than the second threshold value. More specifically, if the mean color difference derived by the acquisition unit 66 falls outside the permissible range, the notifying unit 70 causes the image forming control unit 60 to form the second output image G2 on the paper sheet P again after causing the correction unit 68 to correct the profile 88. In this case, the notifying unit 70 causes the acquisition unit 66 to derive the mean color difference again. If the mean color difference falls outside the permissible range and the first threshold value is higher than the second threshold value, the notifying unit 70 notifies a possibility that the image forming apparatus 10 malfunctions. If the mean color difference falls outside the permissible range and the first threshold value is equal to or below the second threshold value, the notifying unit 70 notifies as a recommended value of the first threshold value a range extending from the second threshold value as a lower limit to a predetermined value higher than the second threshold value as an upper limit.

Figure 8:
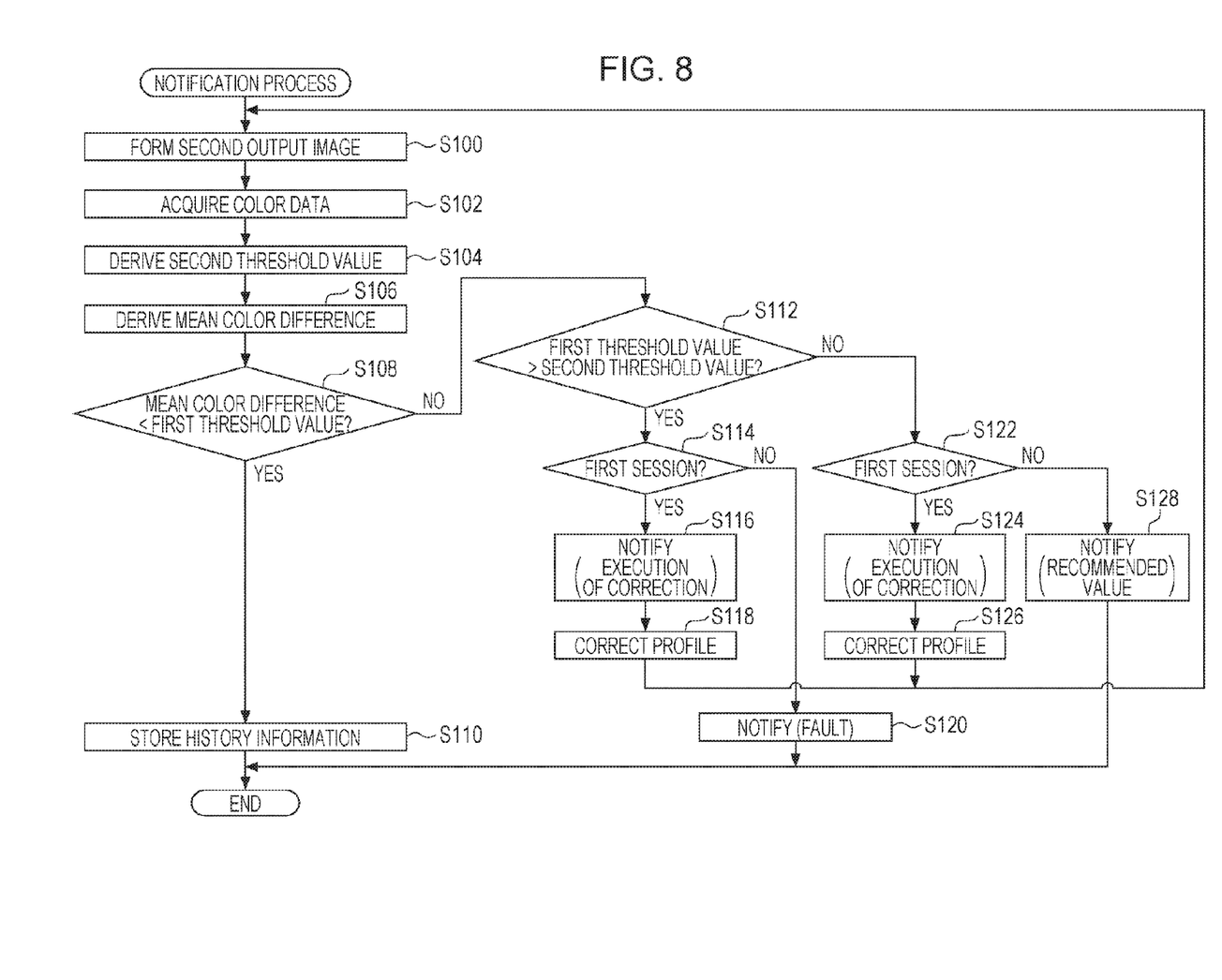
FIG. 8 is a flowchart illustrating a process of a notification processing program of the exemplary embodiment.

The process of the image forming apparatus 10 of the exemplary embodiment is described below with reference to FIG. 8. FIG. 8 is a flowchart illustrating the process of a notification processing program to be executed by the CPU 20. The notification processing program is executed at a periodic timing, such as once a day, and at a timing when an execution start command is input via the operation and display unit 50 by the user. The notification processing program is installed on the ROM 22 in advance. The first threshold value is set by the setting unit 62 prior to the start of the execution of the notification processing program.

In step S100 of FIG. 8, by controlling the image forming unit 42, the image forming control unit 60 forms the second output image G2 in accordance with the image data that results from converting the second input image data 82 stored on the memory 26 using the profile 88. In step S102, the acquisition unit 66 acquires the color data that results from the colorimeter 44 reading the second output image G2 formed on the paper sheet P in the operation in step S100.

In step S104, based on the target information 84, the operation paper information 90, and the production condition of the profile 88, as previously described, the deriving unit 64 derives the theoretical value of the limit value of the color difference that is adjustable using the profile 88. The deriving unit 64 derives as the second threshold value a value that results from adding to the derived theoretical value a mean value of history information stored on the memory 26 stored in operations in step S110 executed in the past and discussed below. If the history information is not stored on the memory 26, for example, if the operation in step S104 is performed for the first time, the theoretical value may be output as the second threshold value. Alternatively, the sum of the theoretical value and a value that is empirically determined may be derived as the second threshold value.

In step S106, the acquisition unit 66 derives the mean color difference of the color data acquired in step S102 and the target information 84 as described previously. In step S108, the acquisition unit 66 determines whether the mean color difference of the target information 84 and the second output image G2 formed on the paper sheet P in step S100 falls within the permissible range, by determining whether the mean color difference derived in step S106 is less than the first threshold value. If the determination in step S108 is non-affirmative, processing proceeds to step S112. If the determination in step S108 is affirmative, processing proceeds to step S110. In step S110, the acquisition unit 66 stores on the memory 26 a difference as the history information between the theoretical value derived in step S104 and the mean color difference derived in step S106. The notification process is complete when the operation in step S110 ends.

In step S112 on the other hand, the notifying unit 70 determines whether the first threshold value is higher than the second threshold value derived in step S104. If the determination in S112 is non-affirmative, processing proceeds to step S122. If the determination in S112 is affirmative, processing proceeds to step S114. In step S114, the notifying unit 70 determines that the mean color difference derived in step S106 falls outside the permissible range for the first time, by determining whether the operation in step S114 is performed for the first time from the start of the execution of the notification process. If the determination in S114 is non-affirmative, processing proceeds to step S120. If the determination in S114 is affirmative, processing proceeds to step S116.

In step S116, the notifying unit 70 notifies the user that the profile 88 is to be corrected. More specifically, the notifying unit 70 displays on a display screen of the operation and display unit 50 a first notification screen that notifies that the profile 88 is to be corrected.

Figure 9:
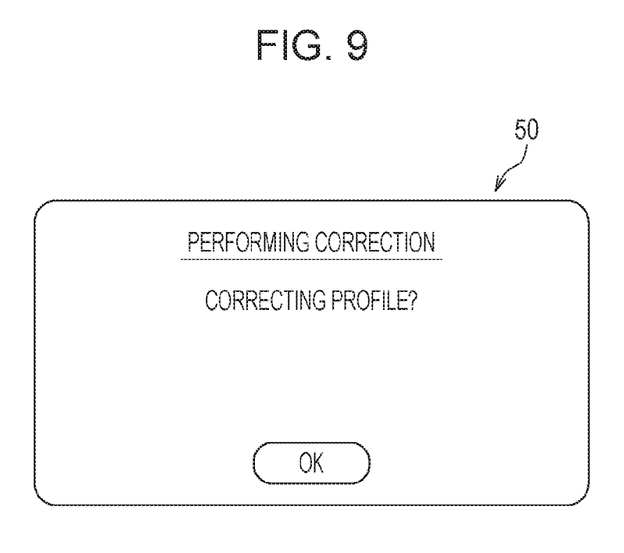
FIG. 9 illustrates an example of a first notification screen of the exemplary embodiment.

FIG. 9 illustrates an example of the first notification screen of the exemplary embodiment. Referring to FIG. 9, the first notification screen displays information indicating that the profile 88 is to be corrected. To end the displaying of the first notification screen and continue the notification process, the user selects an OK button displayed at the bottom of the first notification screen.

In step S118, as previously described, the correction unit 68 performs the interpolation operation on the color data acquired in step S102, thereby deriving the color data of the number of colors corresponding to the target information 84. Based on the derived color data and the target information 84, the correction unit 68 corrects the profile 88 stored on the memory 26 so that the color difference between the corresponding colors in the derived color data and the target information 84 is canceled. Subsequent to the end of the operation in step S118, processing returns to step S100.

In step S120, the notifying unit 70 notifies the user that the image forming apparatus 10 may possibly malfunction. More specifically, the notifying unit 70 displays on the display screen of the operation and display unit 50 a second notification screen notifying the user that the image forming apparatus 10 may possibly malfunction.

Figure 10:
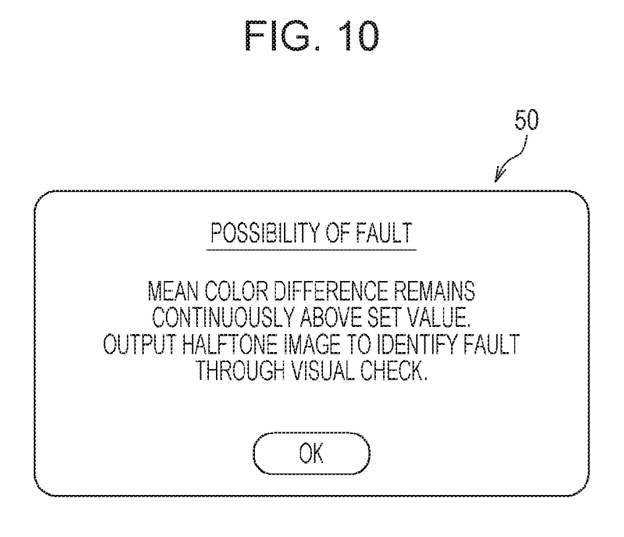
FIG. 10 illustrates an example of a second notification screen of the exemplary embodiment.

FIG. 10 illustrates an example of the second notification screen of the exemplary embodiment. The second notification screen of the exemplary embodiment displays information indicating that the image forming apparatus 10 may possibly malfunction. The second notification screen of the exemplary embodiment further displays information indicating that the mean color difference remains above the first threshold value (referred to as a set value in FIG. 10), and information advising the user to output a halftone image to visually check that no fault is occurring. To end the displaying of the second notification screen, the user selects the OK button at the bottom of the second notification screen. When the operation in step S120 is complete, the notification process ends.

In step S122, the notifying unit 70 determines whether the mean color difference derived in step S106 falls outside the permissible range for the first time, by determining whether the operation in step S122 is performed for the first time from the start of the execution of the notification process. If the determination in S122 is non-affirmative, processing proceeds to step S128. If the determination in S122 is affirmative, processing proceeds to step S124.

In step S124, the notifying unit 70 notifies the user that the profile 88 is to be corrected. More specifically, the notifying unit 70 displays on the display screen of the operation and display unit 50 a third notification screen notifying that the profile 88 is to be corrected.

Figure 11:
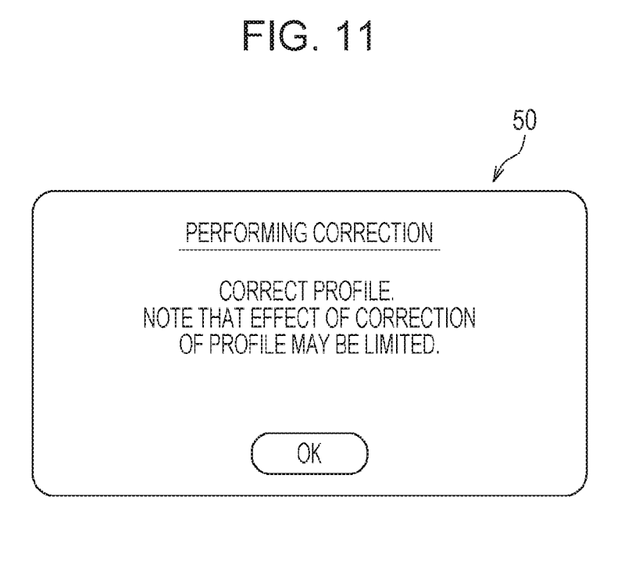
FIG. 11 illustrates an example of a third notification screen of the exemplary embodiment.

FIG. 11 diagrammatically illustrates an example of the third notification screen of the exemplary embodiment. Referring to FIG. 11, the third notification screen of the exemplary embodiment displays information indicating that the profile 88 is to be corrected. The third notification screen of the exemplary embodiment also displays information indicating that the improvement effect provided by correcting the profile 88 may be limited. To end the displaying of the third notification screen and continue the notification process, the user selects the OK button displayed at the bottom of the third notification screen.

In step S126, as in step S118, the correction unit 68 corrects the profile 88 stored on the memory 26. When the operation in step S126 is complete, processing returns to step S100.

In step S128, the notifying unit 70 notifies as a recommended value of the first threshold value a range extending from the second threshold value derived in step S104 as a lower limit to a predetermined value higher than the second threshold value as an upper limit. More specifically, the notifying unit 70 displays on the display screen of the operation and display unit 50 a fourth notification screen notifying the user the recommended value of the first threshold value.

Figure 12:
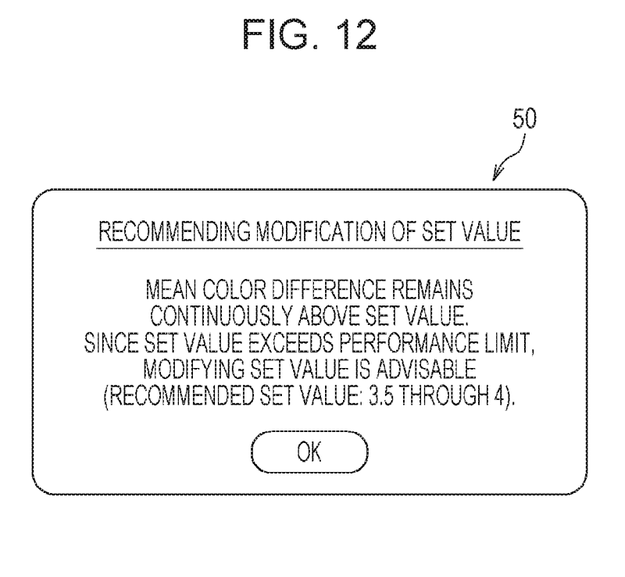
FIG. 12 illustrates an example of a fourth notification screen.

FIG. 12 diagrammatically illustrates an example of the fourth notification screen. Referring to FIG. 12, the fourth notification screen of the exemplary embodiment displays information that advises the user to modify the first threshold value (referred to as a set value in FIG. 12). The fourth notification screen of the exemplary embodiment also displays information that indicates a recommended range of the first threshold value (a range from 3.5 to 4 in FIG. 12). To end the displaying of the fourth notification screen and continue the notification process, the user selects the OK button at the bottom of the fourth notification screen. When the operation in step S128 is complete, the notification process ends.

The user learns the recommended value of the first threshold value by checking the fourth notification screen. The user then newly sets a first threshold value via the operation and display unit 50. This avoids setting the first threshold value set by the user to be stricter than (in the exemplary embodiment, lower than) the limit value that the image forming apparatus 10 is able to adjust using the profile 88.

In step S100 of the notification process of the exemplary embodiment, the first output image G1 may be formed on the paper sheet P under the control of the image forming control unit 60. In such a case, in step S102, the acquisition unit 66 acquires the color data that results from the colorimeter 44 reading the first output image G1 formed on the paper sheet P in the operation in step S100.

In accordance with the exemplary embodiment, the second threshold value is derived by adding to the theoretical value the statistical value of the history information stored on the memory 26. The present invention is not limited this method. For example, the second threshold value may be derived by adding to the theoretical value the statistical value of the history information similarly stored on multiple image forming apparatuses connected via a network. In such a case, the history information similarly stored on an image processing apparatus of the same type as the image forming apparatus 10 may be used.

In accordance with the exemplary embodiment, the notifying unit 70 notifies to the user each screen by displaying the screen on the display screen of the operation and display unit 50. The present invention is not limited to this method. For example, the notifying unit 70 may notify, to the user, display contents on the corresponding screen by emitting a voice or forming an image on the paper sheet P.

In accordance with the exemplary embodiment, the notification processing program is installed on the ROM 22 in advance. The present invention is not limited to this method. For example, the notification processing program may be provided in a stored form on a memory medium, such as a compact disk read only memory (CD-ROM), or may be provided via a network.

In accordance with the exemplary embodiment, the notification process is performed by a software mechanism using a computer that executes the program. The present invention is not limited to this method. For example, the notification process may be performed using a hardware configuration, or a software configuration or a combination thereof.

The configuration of the image forming apparatus 10 of the exemplary embodiment (see FIG. 1 and FIG. 2) is illustrated for exemplary purposes only, and an element may be deleted from or a new element may be added to the configuration as long as such a deletion or addition falls within the scope of the present invention.

The process of the notification processing program (see FIG. 8) has been described for exemplary purposes only, and a step may be deleted in the process or a new step may be added to the process or the order of the steps may be changed as long as such a modification falls within the scope of the present invention.

The information of each screen illustrated in the exemplary embodiment (see FIG. 9 through FIG. 12) has been described for exemplary purposes only, and a part of the information may be deleted or a new part may be added to the information or a display position of the information may be changed in location as long as such a modification falls within the scope of the present invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a setting unit that sets a first threshold value that serves as a determination criterion as to whether a color difference as a difference between a target value of a color and a value indicating a corresponding color of an image formed on a recording medium falls within a permissible range;
    a deriving unit that derives, using conversion information related to converting a color of an input image into a color of an output image, a second threshold value that serves as a limit value of the color difference that is adjustable;

an acquisition unit that acquires the color difference in a case where the image is formed on the recording medium using the conversion information; and a notifying unit that, with the color difference acquired by the acquisition unit falling outside the permissible range, changes contents of notification and notifies the changed contents of notification depending on whether the first threshold value is higher than the second threshold value.

2. The image processing apparatus according to claim 1, wherein the deriving unit derives the second threshold value in accordance with the target value of the color, recording medium information including color information indicating a base color of the recording medium, and a production condition of the conversion information.

3. The image processing apparatus according to claim 2, wherein the deriving unit derives as the second threshold value a value that results from adding, to a theoretical value of the limit value that is derived from the target value of the color, the recording medium information, and the production condition, a statistical value of differences, each of the differences being a difference between a theoretical value that has been derived in the past in a case where the color difference falls within the permissible range and the color difference that has been acquired by the acquisition unit when the past theoretical value has been derived.

4. The image processing apparatus according to claim 2, wherein the deriving unit derives as the second threshold value a value that results from adding, to a theoretical value that is derived from the target value of the color, the recording medium information, and the production condition, a statistical value of differences in a plurality of image forming apparatuses, each of the differences being determined from a difference between a theoretical value that has been derived in the past in a case where the color difference falls within the permissible range and the color difference that has been acquired by the acquisition unit when the past theoretical value has been derived.

5. The image processing apparatus according to claim 1, wherein if the color difference acquired by the acquisition unit falls outside the permissible range and the first threshold value is equal to or below the second threshold value, the notifying unit notifies as a recommended value of the first threshold value a range extending from the second threshold value serving as a lower limit to a predetermined value higher than the second threshold value serving as an upper limit.

6. The image processing apparatus according to claim 2, wherein if the color difference acquired by the acquisition unit falls outside the permissible range and the first threshold value is equal to or below the second threshold value, the notifying unit notifies as a recommended value of the first threshold value a range extending from the second threshold value serving as a lower limit to a predetermined value higher than the second threshold value serving as an upper limit.

7. The image processing apparatus according to claim 3, wherein if the color difference acquired by the acquisition unit falls outside the permissible range and the first threshold value is equal to or below the second threshold value, the notifying unit notifies as a recommended value of the first threshold value a range extending from the second threshold value serving as a lower limit to a predetermined value higher than the second threshold value serving as an upper limit.

8. The image processing apparatus according to claim 4, wherein if the color difference acquired by the acquisition unit falls outside the permissible range and the first threshold value is equal to or below the second threshold value, the notifying unit notifies as a recommended value of the first threshold value a range extending from the second threshold value serving as a lower limit to a predetermined value higher than the second threshold value serving as an upper limit.

9. The image processing apparatus according to claim 5, wherein the notifying unit, after correcting the conversion information to cancel the color difference, causes the acquisition unit to acquire the color difference again, and with the color difference falling outside the permissible range, notifies a possibility of a fault if the first threshold value is higher than the second threshold value or notifies the recommended value if the first threshold value is equal to or below the second threshold value.

10. The image processing apparatus according to claim 6, wherein the notifying unit, after correcting the conversion information to cancel the color difference, causes the acquisition unit to acquire the color difference again, and with the color difference falling outside the permissible range, notifies a possibility of a fault if the first threshold value is higher than the second threshold value or notifies the recommended value if the first threshold value is equal to or below the second threshold value.

11. The image processing apparatus according to claim 7, wherein the notifying unit, after correcting the conversion information to cancel the color difference, causes the acquisition unit to acquire the color difference again, and with the color difference falling outside the permissible range, notifies a possibility of a fault if the first threshold value is higher than the second threshold value or notifies the recommended value if the first threshold value is equal to or below the second threshold value.

12. The image processing apparatus according to claim 8, wherein the notifying unit, after correcting the conversion information to cancel the color difference, causes the acquisition unit to acquire the color difference again, and with the color difference falling outside the permissible range, notifies a possibility of a fault if the first threshold value is higher than the second threshold value or notifies the recommended value if the first threshold value is equal to or below the second threshold value.

13. An image forming apparatus comprising:
the image processing apparatus according to claim 1; and
an image forming unit that forms an image on the recording medium.

14. An image processing method comprising:
setting a first threshold value that serves as a determination criterion as to whether a color difference as a difference between a target value of a color and a value indicating a corresponding color of an image formed on a recording medium falls within a permissible range;
deriving, using conversion information related to converting a color of an input image into a color of an output image, a second threshold value that serves as a limit value of the color difference that is adjustable;
acquiring the color difference in a case where the image is formed on the recording medium using the conversion information; and
with the acquired color difference falling outside the permissible range, changing contents of notification and notifying the changed contents of notification depending on whether the first threshold value is higher than the second threshold value.

15. A non-transitory computer readable medium storing a program causing a computer to execute a process for processing an image, the process comprising:
- setting a first threshold value that serves as a determination criterion as to whether a color difference as a difference between a target value of a color and a value indicating a corresponding color of an image formed on a recording medium falls within a permissible range;
- deriving, using conversion information related to converting a color of an input image into a color of an output image, a second threshold value that serves as a limit value of the color difference that is adjustable;
- acquiring the color difference in a case where the image is formed on the recording medium using the conversion information; and
- with the acquired color difference falling outside the permissible range, changing contents of notification and notifying the changed contents of notification depending on whether the first threshold value is higher than the second threshold value.

* * * * *